United States Patent

Monchalin et al.

[19]

[11] Patent Number: 6,078,397
[45] Date of Patent: Jun. 20, 2000

[54] METHOD AND APPARATUS FOR MAPPING THE WALL THICKNESS OF TUBES DURING PRODUCTION

[75] Inventors: Jean-Pierre Monchalin; Alain Blouin; Christian Padioleau, all of Montreal, Canada

[73] Assignee: National Research Council, Ottawa, Canada

[21] Appl. No.: 09/294,208

[22] Filed: Apr. 20, 1999

[51] Int. Cl.[7] .................................................. G01B 9/02
[52] U.S. Cl. .................. 356/357; 356/345; 356/349; 356/432 T
[58] Field of Search .................. 356/345, 347, 356/349, 432

[56] References Cited

U.S. PATENT DOCUMENTS 4,522,510  6/1985  Rosenewaig et al. .
5,633,711  5/1997  Nelson et al. .

Primary Examiner—Robert H. Kim
Attorney, Agent, or Firm—Paul S. Sharpe; Marks & Clerk

[57] ABSTRACT

An apparatus and method for mapping out wall thickness of a tube or other object having motion in two directions. The device includes a first laser for generating ultrasound propagating inside tube wall over a particular generation spot on a surface of the tube, a second laser coupled to an interferometer for detecting produced ultrasonic echoes over a detection spot on the surface. A processor is provided for operating on recorded ultrasonic echoes and using a given value of ultrasonic velocity and the distance between the generation spot and the detection spots for determining wall thickness at a mid-point between the generation and detection spot. An optical displacement measuring device determines a displacement in two dimensions between the generation spot and arbitrary starting spot and a display for displaying wall thickness values over the surface of the tube.

26 Claims, 6 Drawing Sheets

METHOD AND APPARATUS FOR MAPPING THE WALL THICKNESS OF TUBES DURING PRODUCTION

FIELD OF THE INVENTION

The present invention relates to a method and apparatus to measure and to map out directly on the production line the wall thickness of tubes which are in rotational and translational motion and which could be at elevated temperatures. More particularly, the method and the apparatus are based on the generation and detection of ultrasound with lasers.

BACKGROUND OF THE INVENTION

Tubes and pipes are widely used products that can be manufactured by various processes. They can be made with a seam by bending a flat sheet and welding it or seamless. Among the seamless processes, rotary piercing, in which a mandrel is forced into a hot round billet set in rotation by two rolls, is used to manufacture steel tubing for critical applications such as oil drilling. This process is also used to make tubes (mechanical tubing) which are later cut and machined into a variety of mechanical parts, such as the races of ball bearings. After initial piercing, the tube is rolled down to its final diameter and wall thickness during operations in which the tube is usually in rotation and translation. Well-defined specifications of diameter and wall thickness are generally required, particularly in the case of mechanical tubing. It is obviously desirable to perform this dimensional control on-line, just after processing, which means at a stage where the tube is at elevated temperature and in motion. The traditional approach of removing a tube from the line to section it and to cool it rapidly for measuring its dimensions with a conventional thickness gauge, is time consuming and does not provide real-time information on all the produced tubing. For outer diameter measurement, optical gauges, using in particular a scanning laser beam, have been developed and are commercially available. For the determination of thickness, penetrating radiation, such as y-rays, and ultrasonics can be used, at least in principle. Systems based on y-rays have been developed using several y sources and detectors encircling the tube and provide by a tomographic reconstruction algorithm thickness mapping of the tube. Systems of this kind are in particular available from IMS Measuring Systems, Inc., 108 Blue Ridge Drive, Cranberry Twp., Pa. 16066, USA. The tested tube, in this case, should be in linear motion and not rotating. These systems are somehow sensitive to the exact location of the tube inside the gauge and are not easily movable. Another drawback is the use of radioactive materials. Ultrasonic determination of thickness does not have these limitations and is based on the measurement of the time-of flight between the echoes produced by the ultrasonic wave reverberating within the tube wall. Knowing the ultrasonic velocity from calibration (this velocity is a function of the material itself and of its temperature, which can be in principle measured by pyrometry), the wall thickness can be determined.

Ultrasonics uses generally piezoelectric transducers for the generation and detection of ultrasound, but these devices cannot be used in the case of a very hot (typically 1000 degrees Celsius) product. Non-contact generation and detection is required. Although electromagnetic transducers (called EMATs) have been developed for this purpose, they require close proximity to the tested part and tube guidance and are not used in practice for these reasons. A practical solution to ultrasonic coupling is provided by the generation and detection of ultrasound with lasers (laser-ultrasonics).

Two lasers are used, one for generation, which gives a short and intense pulse and another one for detection, which is very stable and has a pulse sufficiently long to capture several ultrasonic echoes. Generation of ultrasound proceeds from the transient surface heating and material ablation produced by the generation laser. Detection is performed by the detection laser, which, when associated to an optical interferometer, senses the small surface motion produced by the ultrasonic wave reverberating within the material. The detection principle, which can be used in particular for tube wall thickness measurement, has been described in various U.S. patents by applicant and associates: J.-P. Monchalin, "Optical Interferometric Reception of Ultrasonic Energy", U.S. Pat. No. 4,659,224, issued Apr. 21, 1987; R. Heon and J.-P. Monchalin, "Optical detection of a surface motion of an object using a stabilized interferometric cavity", U.S. Pat. No. 5,137,361, issued Aug. 11, 1992; J.-P. Monchalin, "Broadband optical detection of transient surface motion from a scattering surface", U.S. Pat. No. 4,966,459, issued Oct. 30, 1990; J.-P. Monchalin and R. K. Ing, "Broadband Optical Detection of Transient Motion from a Scattering Surface", U.S. Pat. No. 5,131,748, issued Jul. 21, 1992. The feasibility of using laser-ultrasonics for the on-line measurement of the wall thickness of tubes has been demonstrated by applicant and coworkers in a tube mill and is described in the following publications: J. -P. Monchalin, "Progress towards the application of laser-ultrasonics in industry", Review of Progress in Quantitative NDE, eds D. O. Thompson and D. E. Chimenti, vol 12A, pp. 495–506, Plenum Press, 1993; J.-P. Monchalin, A. Blouin, D. Drolet, P. Bouchard, R. Heon, C. Padioleau, "Wall thickness Measurement of Tubes an Eccentricity Determination by Laser-Ultrasonics", 39th Mechanical Working & Steel Processing Conference, Iron & Steel Society, Indianapolis, In., Oct. 19–22, 1997, Iron & Steel Society, Warrendale, Pa., Vol. XXXV pp. 927–931. In this demonstration, the tube was in linear motion and not rotating, so the measurement was performed only along a line. The generation and detection spots were also superimposed, which, as we discovered later, has the consequence of producing additional noise on the detected signal.

Industry requires more than the mere measurement along a single line at the surface of a tube. Full mapping of the thickness profile throughout the tube surface is required, this being in particular needed for the determination of tube eccentricity. An obvious solution would be to use for this purpose several laser ultrasonic systems, as described in the communication entitled "Laser Ultrasonics in Industry" presented by M. Paul, A Hoffman, G. J. Deppe and L. Oesterlein at the 7th European Conference on Nondestructive Testing, Copenhagen, 26–29 May 1998. Since the cross section of a tube is not usually delimited by two offset circles, but has a more complex profile, appropriate mapping requires a sufficient number of measurement locations around the circumference, and as an example, ten may be used. Therefore, ten systems would be needed resulting in an enormous complexity and prohibitive cost. The present invention provides a practical solution to this problem, which does not require the use of multiple laser-ultrasonic systems.

SUMMARY OF THE INVENTION

One object of the present invention is to provide an improved method and apparatus for mapping the wall thickness of tubes during production.

A further object of the embodiment of the present invention is to provide the apparatus for mapping out wall thickness of a tube or other object having motion in two directions, comprising:

first laser means for generating ultrasound propagating inside tube wall over a particular generation spot on a surface of the tube;

second laser means coupled to an interferometric means for detecting produced ultrasonic echoes over a detection spot on the surface;

processing means operating on recorded ultrasonic echoes and using a given value of ultrasonic velocity and the distance between the generation spot and the detection spots for determining wall thickness at a mid-point between the generation and detection spot;

optical displacement measuring means for determining a displacement in two dimensions between the generation spot and arbitrary starting spot; and display means for displaying wall thickness values over surface of the tube.

Another object of one embodiment of the present invention is to provide the method for mapping out wall thickness of tubes or other objects having motion in two directions comprising the steps of:

directing a first laser beam over a particular generation spot at a tube surface for generating ultrasound propagating inside the tube wall;

directing a second laser beam onto a detection spot at the tube surface; receiving light from the detection spot and demodulating it in an interferometer to provide a signal representative of ultrasonic echoes;

processing the signal, using a given value of ultrasonic velocity and distance between the generation spot and the detection spot to determine wall thickness at the midpoint between the generation spot and the detection spot;

measuring optically tube displacement in two dimensions between the generation spot and an arbitrary starting spot; and displaying wall thickness values over the tube surface.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
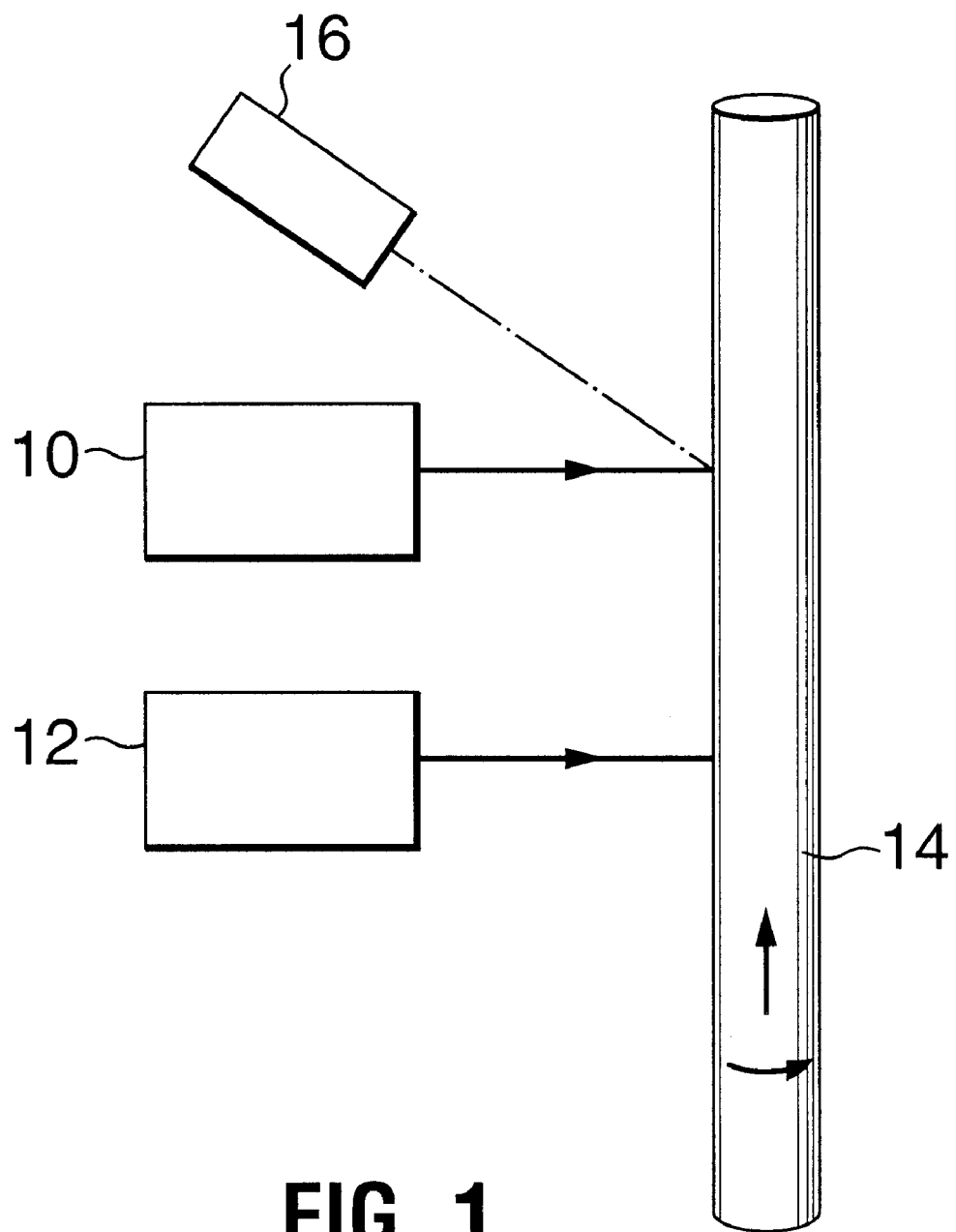
FIG. 1 is a general schematic of the apparatus according to one embodiment of the invention.

The invention is first based on using a single laser-ultrasonic system to measure the wall thickness at a particular location coupled with an optical system that measures the tube displacement. Since the tube has both rotational and translational motions (similar to helicoidal motion), this optical system has to measure the displacement in two directions. A general embodiment according to the invention is shown in FIG. 1 and includes a laser ultrasonic sub-system 10 for measuring thickness at a particular location and a displacement measuring sub-system for tracking tube motion from one thickness (tube generally denoted by numeral 14) measuring location to the next. As shown in FIG. 1, the location of measurement of the displacement could be different from the location of thickness measurement since the tube is a rigid body. FIG. 1 also shows an optical pyrometer that measures the tube temperature at the location of thickness determination.

Figure 2:
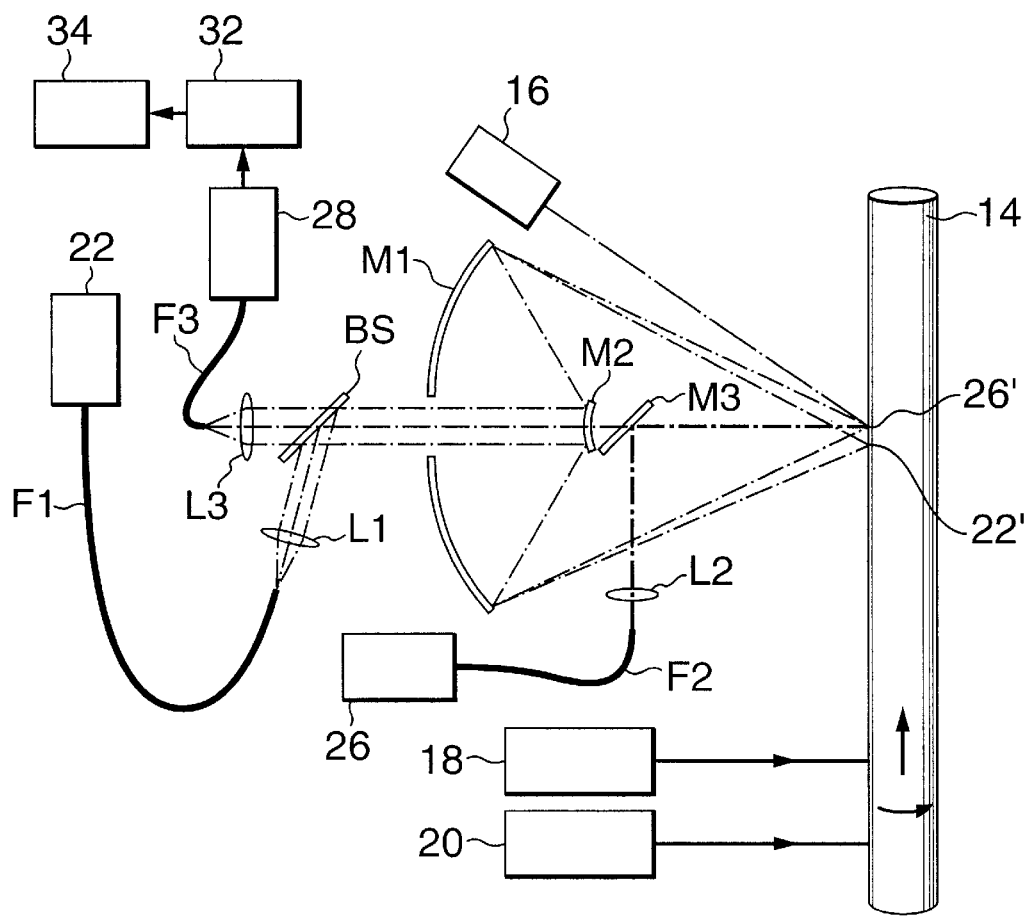
FIG. 2 is a schematic illustration of a first embodiment of the apparatus, including a detailed description of the laser ultrasonic sub-system.

A first preferred embodiment of the apparatus is shown in FIG. 2. FIG. 2 shows in detail the laser ultrasonic sub-system 10 and also that the displacement sub-system 12 is constituted by two laser velocimeters. These velocimeters are described in detail in FIGS. 4 and 5 (discussed hereinafter), each representing a separate embodiment. As shown in FIG. 2 the generation beam (not shown) from generation laser 22 is first transmitted by a large core multimode fiber F1. The beam is then approximately collimated by a lens L1 and reflected by a beam splitter, BS. Focusing onto the tube surface to a spot 22' typically of a few millimeters in diameter is performed by a mirror optical system of the Cassegrain type constituted by the small convex mirror M2 and the large concave mirror M1. The detection beam from detection laser 26 is also transmitted by a large core multimode fiber F2 and focused onto a spot 26' on the tube 14 distinct from generation spot 22' by a lens L2 after reflection off a small mirror M3 in front of the Cassegrain optical system. Scattered light from this detection spot is then collected by the Cassegrain optical system, passes though the beam splitter, BS, to be finally focused by lens L3 onto a large core optical fiber F3, which transmits it to the optical demodulator 28. The optical demodulator 28 converts the phase or frequency modulation produced by the ultrasonic motion at detection spot into an intensity modulation, which is itself converted into an electrical signal representative of the ultrasonic motion by an optical detector (not shown, positioned inside the demodulator box). The demodulator 28 is based on one of the schemes described in the U.S. patents mentioned above, i.e. it uses either a confocal Fabry-Perot in transmission or in reflection or a photorefractive crystal used in a two-wave mixing configuration. It is also possible to use a crystal with two electrodes and the principle of the photoelectromotive force generation by a moving fringe pattern, as described by I. A. Sokolov, S. I. Stepanov and G. S. Trofimov, in the *Journal Opt. Soc. Am B*/Vol. 9, No. 1/January 1992, p.p. 173–176. The signal from the demodulator is then processed by a computer 32 to derive the thickness value. Processing involves digital sampling followed by cross-correlation between two consecutive ultrasonic echoes to determine the time-of-flight between these echoes. When the tube 14 is too thick, so essentially one echo is seen, the cross-correlation is performed between this echo and a reference echo, which would have been observed for a smaller thickness and is obtained with a thinner calibration specimen made of the same material. It is noted that the illumination beam for detection and the collected beam have the same axis, which is identical to the optical axis of the Cassegrain optical system, whereas the generation beam has a different axis and gives a generation spot offset from the one of detection by a given distance δ. This feature is not usual and is an innovative feature of the apparatus. It was found that this arrangement minimizes the additional detection noise produced by material ablation from the generation laser and thus improves sensitivity. It has also the advantage of allowing operation of the generation and detection lasers at the same wavelength. Operation at the same wavelength is not usually possible when the spots are superimposed, since in this case the generation laser light collected by the detector is sufficiently strong to damage it. The propagation distance between two consecutive echoes is slightly different from twice the wall thickness d and is equal to twice the square root of $d^2+(δ/2)^2$. From the time-of-flight, the value of δ and the value of the ultrasonic velocity at the temperature determined by the pyrometer 16, the computer calculates the thickness d. This is precisely the thickness at the mid-point between the generation and detection spots, although in practice the thickness varies slowly and the offset δ is small, so the thickness at the generation spot, at the detection spot and at the mid-point between them are about the same. The computer 32 finds the value of the ultrasonic velocity from velocity-versus-temperature calibration data obtained previously off-line and stored in its memory. This calibration data could have been for example obtained by measuring the time-of-flight between echoes of a specimen of the same material and known thickness while its temperature is being monitored by a pyrometer 16 or a thermocouple. Using the location of measurement information provided by the velocimeters 18 and 20, the computer then plots a map of the thickness profile over the tube surface, which is displayed by the display system 34. From this thickness map, tube eccentricity along the tube length is calculated and is also displayed by the display system. In the embodiment of FIG. 2, it is also noted that all the beams are fiber coupled, which has the advantage of allowing remote location of the two lasers 22 and 26, far away from the hot tube and the piercing or elongating machinery (not shown). Obviously a configuration where the beams are not fiber coupled could also be implemented and a collecting optical system of a different kind, using in particular all refractive optical elements could also be implemented. The pyrometer that measures the surface temperature at the location of thickness measurement could also be fiber coupled and remotely located.

Figure 3:
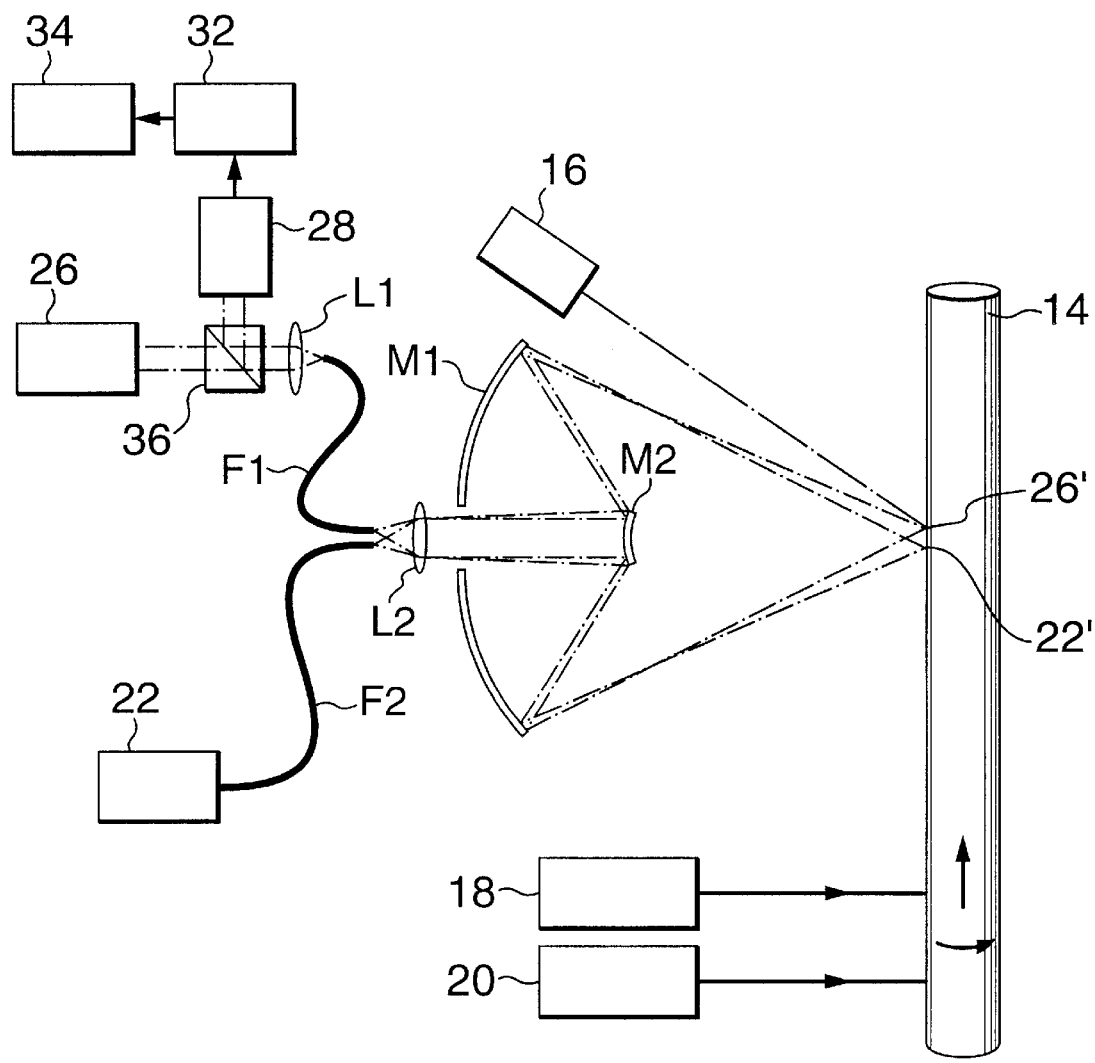
FIG. 3 is a schematic illustration of a second embodiment of the apparatus, including a detailed description of the laser ultrasonic sub-system.

A second embodiment of the laser-ultrasonic sub-system 10 is shown in FIG. 3. In this embodiment the generation and detection spots are also separated, all the laser beams are fiber coupled and the same mirror optical system is used. As shown in FIG. 3, the detection laser beam is focused with a lens L1 onto a large core multimodal fiber F1 after passing through a polarizing beam splitter. The generation laser beam is also transmitted by a large core multimodes fiber F2. The ends of the two fibers are set side by side approximately in the focal plane of a lens L2. The nearly collimated beams are then projected onto the tube as two distinct spots by the Cassegrain system constituted of mirrors M1 and M2. The spots are offset by a fixed distance determined by the offset of the two fibers and the magnification of the system constituted by mirrors M1, M2 and the lens L2. Scattered light from the detection spot is then collected by M1, M2 and the lens L2 and is transmitted by the fiber F1 to the lens L1 and the polarizing beam splitter 36, which reflects it onto the demodulator 28. A polarizing beam splitter 36 is used to minimize any spurious light from the high power detection laser 26 to be received by the demodulator 28. The detection laser 26 is polarized along the transmission polarization of the polarizing beam splitter 36, so any light reflected by surfaces of lens L1 and the front end of fiber F1 will not be received by the demodulator 28. Further rejection is obtained by anti-reflection coating the other end of the fiber F1 and the lens L2. Processing of the demodulator signal, determination of the thickness map and of the eccentricity and display of the information are performed as explained above. This embodiment uses also a pyrometer 16 and velocimeters 18, 20 as in the previous embodiment.

Figure 4:
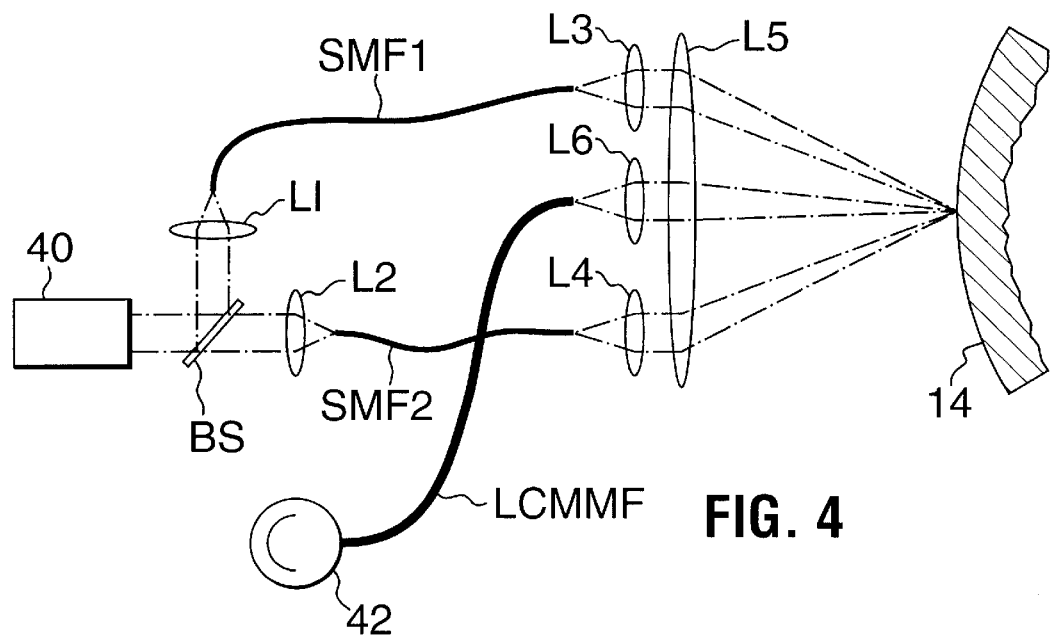
FIG. 4 is a schematic illustration of a first embodiment of a velocimeter sub-system based on laser Doppler velocimetry.

Regarding the displacement measuring sub-system 12, it could be constituted by two laser Doppler velocimeters. A laser Doppler velocimeter measures the transverse velocity of a moving object by making two optical beams derived from the same laser to intersect at the surface of the object, thus creating an interference fringe pattern. The scattered light is then collected by an optical detector and has a modulated component at a frequency f related to the angle between the intersecting beams 2θ, the optical wavelength λ and the surface velocity $V_x$ in the direction x perpendicular to the fringes (i.e. the direction in the plane of the two beams): $f=2 V_x \sin θ/λ$; θ and λ being known, the measurement of f gives $V_x$. References on the laser Doppler velocimetry can be found in the book by L. E. Drain "*The Laser Doppler technique*" (J. Wiley & Sons, 1980) and in the two following scientific communications: "*Laser Doppler velocimetry: analytical solution to the optical system including the effects of partial coherence of the target*", by H. T. Yura, S. G. Hanson and L. Lading published in the Journal of the Optical society A, Vol. 12, no 9, September 1995, pp. 2040–2047 and "*Laser velocimeters: lower limits to uncertainty*" by L. Lading and R. V. Edwards published in Applied Optics, vol. 32, no 2, July 1993, pp. 3855–3866. Assuming that velocity measurements are performed sufficiently frequently, the displacement is then deduced by numerical integration. One velocimeter measures the velocity in a direction x and the other one in a perpendicular direction y. From these two components the velocity vector and then the displacement vector can be determined. It is noted that it is not required that one of these directions coincides with that of the tube translation. A preferred embodiment for either one of the two velocimeters, which are part of the displacement subsystem, is shown in detail in FIG. 4. FIG. 4, the laser 40 used in the velocimeter is split into two beams of equal intensity by a beam splitter, BS, these beams being focused by lenses L1 and L2 into two single mode polarization preserving fibers SMF1 and SMF2. Light transmitted by these fibers is collimated by lenses L3 and L4 and the two beams are projected onto the tube 14 by big lens L5. The two beams intersect at the tube surface creating the desired fringe pattern. Scattered light, which is modulated at the frequency mentioned above, is collected by lens L5 and lens L6, which focuses onto a large core multimodal fiber, LCMMF. This fiber transmits it to a detector 42, which gives an electrical signal having a component at frequency f. This signal is then processed to determine the velocity in the direction perpendicular to the fringe pattern. It will be realized that only one laser could be used for both velocimeters by further splitting the beam in two. Further, since the detection laser is usually made by amplifying the beam from a low power continuous laser in a pulse amplifier, this low power continuous laser could also be used as laser source for the velocimeters. Doppler velocimetry could also be implemented without fiber coupling. In this case there are several commercially available systems, including in particular the Accuspeed laser velocimeter from the George Kelk Corporation, 48 Lesmill Road, Don Mills, Ontario, M3B 2T5, Canada and the LaserSpeed® velocimeter from TSI inc., 500 Cardigan Road, St. Paul, Minn. 55164, USA. However one will prefer fiber coupling in order to have the maximum of laser and electronic equipment remotely located away from the tube processing line.

Figure 5:
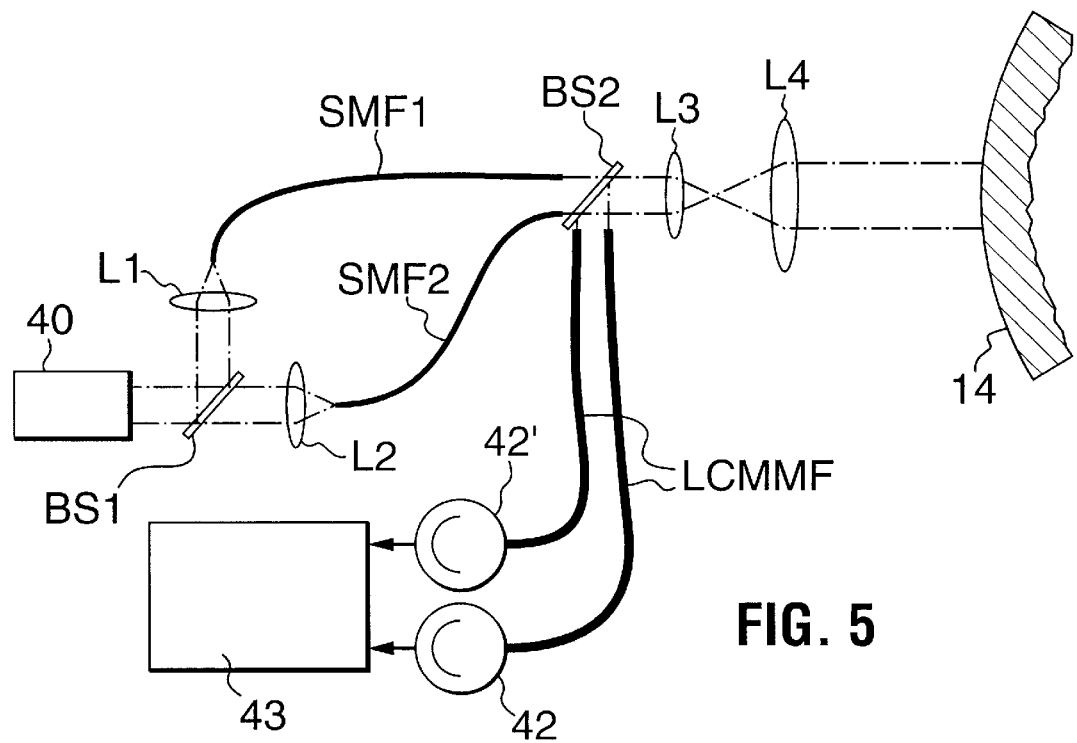
FIG. 5 is a detailed illustration of a second embodiment of a velocimeter subsystem based on laser time-of-flight velocimetry.

Alternatively, instead of using laser Doppler velocimeters, laser Time-of-Flight velocimeters can be used. In these systems light from the same laser 40 is projected onto two spots on the surface of the object separated by a distance d and scattered light from each spot is collected by a detector. The signals from the two detectors are correlated after a time T. The velocity $V_x$ in the direction x of the line passing through the two spots is given by the ratio d/T. References on the laser Time-of-Flight velocimetry can be found in the publication by L. Lading and R. V. Edwards mentioned above and in "*Laser-time-of-flight velocimetry: analytical solution to the optical system based on ABCD matrices*" by H. T. Yura and S. G. Hanson, published in the Journal of the Optical Society A, Vol. 10, no 9, September 1993, pp. 1918–1924. The displacement is obtained as before by integration. A preferred embodiment for either one of the two time-of-flight velocimeters, which are part of the displacement sub-system 12 is shown in FIG. 5. As shown in FIG. 5, the laser used in the velocimeter is split into two beams of equal intensity by a beam splitter BS1, these beams being focused by lenses L1 and L2 into two single mode fibers SMF1 and SMF2. Light from the two fibers passes through a beam splitter BS2 and the fiber ends are imaged with a telecentric optical system constituted of lenses L3 and L4 onto the tube surface. The two distinct spots on the surface, are separated by a well defined distance determined by the fiber separation ahead of the beam splitter and the telecentric system magnification. Light scattered by these two spots is then collected by the same optical system and is reflected by the beam splitter BS2 into two large core multimodal fibers, which transmit it to two detectors 42, 42'. The signals from the detectors 42, 42' are then sent to a correlator 43, which determines the correlation time from which velocity in the direction passing through the two spots on the surface is determined. Correlation may be performed numerically after digitally sampling the two signals.

Figure 6:
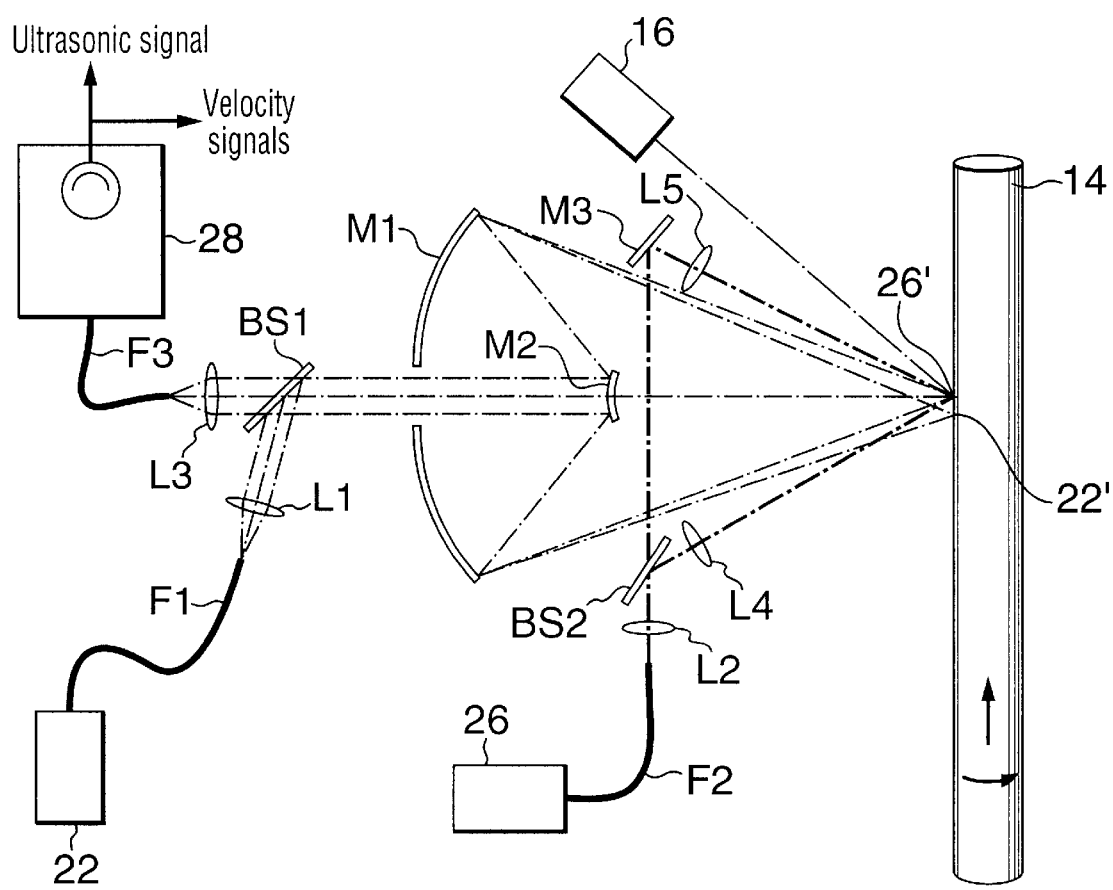
FIG. 6 is a schematic illustration of a third embodiment of the apparatus, in which the laser ultrasonic sub-system and the displacement or velocity measuring sub-system are combined.
Figure 7:
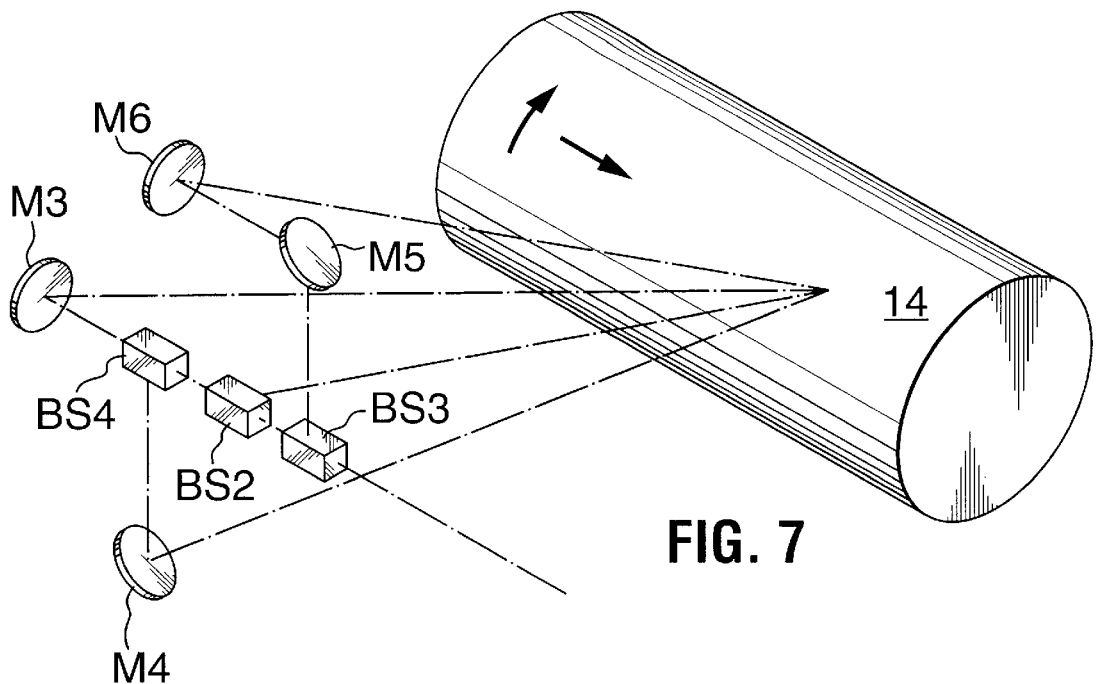
FIG. 7 is a schematic illustration showing how the various beams for ultrasound detection and velocities determination in the embodiment of FIG. 6 are derived.

A third embodiment of the apparatus according to the invention is shown in FIG. 6. This embodiment does not use distinct velocimeters and the arrangement is such that the collected optical signal carries both the ultrasonic signal and the velocity signals, which are then separated for appropriate processing. The optical configuration is identical to that of the first embodiment shown in FIG. 2 except for illumination for detection. As shown in FIG. 6, the detection beam after being transmitted by fiber F2 is collimated by lens L2 and then split into 4 beams, two being in one plane and the other two being in a perpendicular plane. For the sake of clarity only two beams, which are split by beam splitter BS2 are shown in the plane of drawing in FIG. 6. Beam splitter BS2 and mirror M3 direct these two beams, which are then focused by lenses L4 and L5, to the same location on the tube where they produce the fringe pattern. The overall configuration is shown in FIG. 7 in a perspective view (without the focusing lenses). In addition to the two beams reflected by mirror M3 and beam splitter BS2, FIG. 7 shows how the two other beams in the perpendicular plane are derived. These beams give a fringe pattern perpendicular to the previous one at the same location. One is derived from beam splitter BS3 and reflected by mirror M5 and M6 onto the surface. The other one is derived from beam splitter BS4 and is reflected by mirror M4 onto the surface. The light scattered off the illuminated spot on the tube 14 is received by the optical system consisting of mirrors M1, M2 and lens L3. This scattered light, as well as the electrical signal at the output of the detector in the demodulator, have signals representative of the ultrasonic surface motion and velocity signals. Usually the ultrasonic signal has a frequency range much higher than the velocity signals, so it can be readily separated from them by electronic filtering. The signal at lower frequencies is then Fourier transformed and displays two separate peaks, each corresponding to one velocity. These peaks are separated either because the velocities in the two directions are sufficiently different or because the beams have been given different separation angles θ, which result in different fringe spacings. In the configuration shown in FIG. 6 the detection laser beam is coupled through a multimode fiber, so the fringe patterns have a speckle-like structure and the peaks observed after frequency analysis are broad and noisy. However by adjusting an envelope through these data, one finds that the maximum of this envelope is related to the velocity by the simple formulas mentioned above.

Higher accuracy in velocity determination is obtained by coupling directly without fiber the detection laser beam, but with the penalty of having this laser located close to the processing line.

Figure 8:
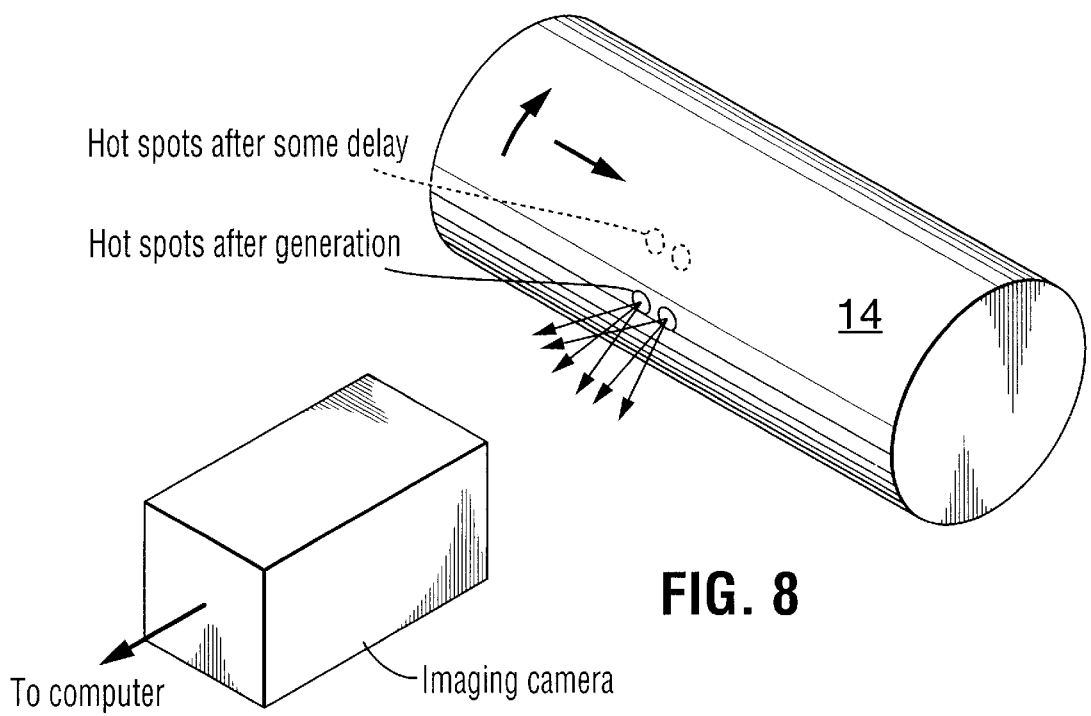
FIG. 8 is an illustration of a third embodiment of the displacement measuring subsystem.

A third embodiment for the displacement sub-system is based on the tracking with an imaging system of the hot spots produced at the surface of the tube by the generation and detection lasers. It is sketched in FIG. 8 using a perspective view. The tube being at an elevated temperature (several hundreds of degrees Celcius) a CCD camera with a short integration time and eventually an image intensifier is used. The camera integrates the light emission from the spots superimposed on the radiation background from the tube over this short integration time (typically a few hundred microseconds). Two image recordings are made at two different times. The camera being protected with an optical filter to block all the generation and detection laser light, the first image is made to start right at laser firing. The recorded frame is then transferred rapidly to the computer. The second recording is made typically several milliseconds later and its frame is also transferred to the computer. In this second recording the hot spots are much less contrasted over the background, since they have cooled down by heat conduction and radiation loss. However one still expects the temperature of the hot spots to be in the range of 5–10 degrees Celcius above the tube temperature after a few milliseconds. Cross-correlation of the two frames gives the tube displacement after taking into account the magnification between the camera plane and the tube surface.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. An apparatus for mapping out wall thickness of a tube or other object having motion in two directions, comprising:

first laser means for generating ultrasound propagating inside tube wall over a particular generation spot on a surface of said tube;

second laser means coupled to an interferometric means for detecting produced ultrasonic echoes over a detection spot on said surface;

processing means operating on recorded ultrasonic echoes and using a given value of ultrasonic velocity and the distance between said generation spot and said detection spots for determining wall thickness at a mid-point between the generation and detection spot;

optical displacement measuring means for determining a displacement in two dimensions between said generation spot and arbitrary starting spot; and display means for displaying wall thickness values over surface of said tube.

2. The apparatus as defined in claim 1, wherein said detection spot is superimposed over said generation spot.

3. The apparatus as defined in claim 1, wherein said detection spot and said generation spot are offset and said first laser means and said second laser means operate at the same wavelength.

4. The apparatus as defined in claim 1, further including pyrometer means for measuring temperature adjacent said generation spot and said detection spot, for determining ultrasonic velocity using velocity.

5. The apparatus as defined in claim 1, further including analysis means for determining from displayed wall thickness values eccentricity values along said tube.

6. The apparatus as defined in claim 1, wherein the beams of said laser means are coupled to the vicinity of the tube by optical fibers, whereby laser means are remotely located from the tube.

7. The apparatus as defined in claim 1, wherein said optical displacement measuring means comprises two optical velocimeters, each velocimeter comprising a laser means to measure two components of tube velocity, for calculating displacement.

8. The apparatus as defined in claim 7, wherein said optical velocimeters are fiber coupled to bring light from said laser means adjacent said tube, whereby said laser means are remotely located from said tube.

9. The apparatus as defined in claim 7, wherein said optical velocimeters have common laser means.

10. The apparatus as defined in claim 7, wherein said laser velocimeters, are laser Doppler velocimeters, each including:

means for splitting a beam from velocimeter laser means into two beams;

means for making said beams intersect on said tube surface to form a fringe pattern;

means for collecting scattered light from said two beams, which includes a signal varying at a frequency related to the velocity component perpendicular to said fringe pattern; and means for processing said signal to determine a velocity component perpendicular to fringe pattern.

11. The apparatus as defined in claim 7, wherein said laser velocimeters are Time-of-Flight laser velocimeters, each including:

means for splitting said beam from velocimeter laser means into two beams;

means to project said beams over two spots on said surface separated by a given distance;

means for collecting light scattered by said two spots onto two optical detectors; and means for correlating signals from said optical detectors to determine time delay, from which, using known said given distance, the velocity component in the direction determined by said spots on said surface of said tube is calculated.

12. The apparatus as defined in claim 1, wherein said optical displacement measuring means comprises:

splitting means for splitting said beam from said second laser means into four beams;

means for making said four beams intersect on said tube surface over said detection spot, a first two of said beams creating a fringe pattern in given direction while a second two of said beams yield a fringe pattern in the perpendicular direction;

means for collecting scattered light from said detection spot, including a signal varying at a frequency related to a velocity component perpendicular to a first fringe pattern, a signal varying at a frequency related to said velocity component perpendicular to said second fringe pattern and ultrasonic echoes;

filtering means for separating ultrasonic echoes and each velocity signal; and means for processing each velocity signal for measuring the two components of the tube velocity, from which tube displacement is calculated by integration.

13. The apparatus as defined in claim 12, wherein a beam from said first laser means and a beam from said second laser means prior to splitting into four beams are coupled through optical fibers adjacent said tube, whereby said laser means are remotely located from the tube.

14. The apparatus as defined in claim 1, wherein said optical displacement measuring means comprises:

an imaging camera to track hot spots produced by said first laser means and said second laser means, including fast shutter means associated to frame grabbing means to record a first image following generation and a second image a given time interval later; and processing means for correlating said first image and said second image and determining displacement during said given time interval.

15. A method for mapping out wall thickness of tubes or other objects having motion in two directions comprising the steps of:

directing a first laser beam over a particular generation spot at a tube surface for generating ultrasound propagating inside the tube wall;

directing a second laser beam onto a detection spot at said tube surface;

receiving light from said detection spot and demodulating it in an interferometer to provide a signal representative of ultrasonic echoes;

processing said signal, using a given value of ultrasonic velocity and distance between said generation spot and said detection spot to determine wall thickness at the mid-point between said generation spot and said detection spot;

measuring optically tube displacement in two dimensions between said generation spot and an arbitrary starting spot; and displaying wall thickness values over said tube surface.

16. The method as defined in claim 15, whereby said detection spot is superimposed over said generation spot.

17. The method as defined in claim 15, whereby said detection spot and said generation spot are offset and both laser beams are at the same wavelength.

18. The method as defined in claim 15, further including the measurement of the temperature in the vicinity of said generation spot and said detection spot with an optical pyrometer, such temperature being used to determine ultrasonic velocity using velocity versus temperature data.

19. The method as defined in claim 15, further including the determining eccentricity along said tube from displayed wall thickness values.

20. The method as defined in claim 15, wherein said beams are brought by optical fibers adjacent said tube, so said lasers are remote from said tube.

21. The method as defined in claim 15, wherein said tube displacement components are calculated by integration of said velocity components determined by optical velocimetry.

22. The method as defined in claim 21, wherein said optical velocimetry technique is laser Doppler velocimetry, consisting of:

splitting a laser beam into two beams;

intersecting said beams at said tube surface to create a fringe pattern;

collecting scattered light from said beams, which includes a signal varying at a frequency related to a velocity component perpendicular to the fringe pattern; and processing said signal to determine said velocity component perpendicular to said fringe pattern.

23. The method as defined in claim 21, wherein the optical velocimetry technique is Time-of-Flight laser velocimetry, consisting of:

splitting a laser beam into two beams;

projecting said beams over two spots on said tube surface separated by a given distance;

collecting light scattered by said spots onto two optical detectors; and correlating signals from said optical detectors to determine time delay, from which, using known said given distance, a velocity component in the direction determined by said spots on said tube surface is calculated.

24. The method as defined in claim 15, wherein optically measuring tube displacement consists in:

splitting said second laser beam into four beams;

making said four beams intersect on said tube surface over said detection spot, a first two of said beams creating a fringe pattern in given direction while a second two of said beams yielding a fringe pattern in the perpendicular direction;

collecting scattered light from said detection spot, which includes a signal varying at a frequency related to said velocity component perpendicular to a first fringe patter, a signal varying at a frequency related to said velocity component perpendicular to said second fringe pattern and ultrasonic echoes;

filtering a collected signal to separate ultrasonic echoes and each velocity signal; and processing each velocity signal for determining the two components of the tube velocity, from which tube displacement is calculated by integration.

25. The method as defined in claim 24, wherein said first laser beam and said second laser beam prior to splitting into four beams are brought by optical fibers to the vicinity of said tube.

26. The method as defined in claim 15, wherein optically measuring tube displacement consists of:

tracking hot spots produced by said first laser beam and said second laser beam with an imaging camera having a fast shutter;

recording a first image following gene ration and a second image a given time interval later;

grabbing said first image frame and said second image frame and transferring them for processing; and correlating said first image frame and said second image frame to determine tube displacement during said given time interval.

* * * * *